United States Patent Office 3,356,752
Patented Dec. 5, 1967

3,356,752
BUTADIENE TRIMERIZATION
Wellington E. Walker, Charleston, W. Va., assignor to Union Carbide Corporation, a corporation of New York
No Drawing. Filed May 18, 1965, Ser. No. 456,804
6 Claims. (Cl. 260—666)

This invention is concerned with producing cyclododecatrienes from butadienes. More particularly, this invention is concerned with an improved catalytic system for the trimerization of butadiene-1,3 to form cyclododeca-1,5,9-triene.

Recently it was found that cyclododecatriene could be obtained by the trimerization of butadiene in contact with, as a catalyst, an alkyl aluminum halide in admixture with a titanium halide. This trimerization is not as selective as is desired, however, and by-products, particularly high molecular weight butadiene polymers, are formed. The presence of these high polymers is undesirable because they are difficult to remove from the cyclododecatriene product and, in addition, effect a considerable increase in the viscosity of the reaction mixture. Further, the presence of these polymers prevents effecting the trimerization in a tubular reactor of small diameter because of the tendency of the polymers to adhere to the walls of the tube, and thus plug the reactor.

It has now been discovered that certain 1,2-dialkoxybenzenes, as hereinafter defined, when present in the reaction system, inhibit the formation of butadiene high polymers. Further, the polymers which do form, instead of being high molecular weight rubbers, are low molecular weight greases which are soluble in the reaction mixture, thus providing a very fluid reaction mixture. As a further advantage, the dialkoxybenzenes are solvents for both the alkyl aluminum halide and the titanium halide, thus providing a single-phase catalyst system rather than a heterogeneous slurry.

The 1,2-dialkoxybenzenes which are employed in accordance with this invention can be generally represented by the formula:

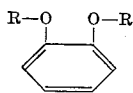

wherein each R, when taken separately, is a lower alkyl group, i.e., an alkyl group of from 1 to about 6 carbons, inclusive, such as methyl, ethyl, propyl, isopropyl, n-butyl, sec-butyl, iso-butyl, pentyl, and hexyl. Illustrative examples of suitable 1,2-dialkoxybenzenes include 1,2-dimethoxybenzene, 1,2-diethoxybenzene, 1,2-diisopropoxybenzene, 1,2-di-tert-butoxybenzene, 1,2-dihexoxybenzene, 1-methoxy-2-ethoxybenzene, 1-methoxy-2-sec-butoxybenzene, 1-methoxy-2-hexoxybenzene, and the like. In addition, substituted dialkoxybenzenes may be employed provided the substituent is not adjacent to either of the 1,2-dialkoxy groups. Illustrative of the substituted 1,2-dimethoxybenzenes are 1-butoxy-4-butyl-2-methoxybenzene, 1,4-diethoxy-2-methoxybenzene, 3,4-dimethoxybenzoic acid and the like. The unsubstituted dialkoxybenzenes are preferred, however, with 1,2-dimethoxybenzene being particularly preferred.

The trimerization in which the dialkoxybenzenes are employed is known, and is fully described in U.S. Patent 2,964,574 to Wilke. In general the process comprises contacting a conjugated diolefin of from 4 to 5 carbons, such as butadiene-1,3-piperylene or isoprene, with a titanium halide and an alkyl aluminum halide.

The titanium halide can be either a trihalide or a tetrahalide, with titanium tetrachloride being generally preferred. The alkyl aluminum halide can be either a monoalkyl aluminum dihalide or a dialkyl aluminum monohalide, with the latter being required when a titanium tetrahalide is employed. Diethyl aluminum chloride is preferred. The molar ratio of aluminum to titanium can vary from as low as 1:1 to 10:1 or even higher. It is an advantage of the use of the dialkoxybenzene that molar ratios of below 10:1 can be employed with no increase in polymer formation, for when dialkoxybenzenes are absent, the degree of polymer formation increases as the molar ratio decreases below 10:1.

The reaction temperature can vary from as low as −20° C. or lower up to 150° C. or even higher. Contrary to the general observation that the degree of high polymer formation increases with increasing temperature, the amount of high polymer actually decreases with increasing temperature when dialkoxybenzenes are present. Thus, the process of this invention permits one to take advantage of the higher reaction rates at elevated temperatures, for example temperatures in the range of from about 50° C. to about 100° C.

Reaction pressure is not highly critical, and sub- or superatmospheric pressures can be employed. It is generally preferred, however, that the reaction system be substantially a liquid-phase system and, thus, elevated pressures of at least about 15 p.s.i.g. are generally employed.

The effective amount of 1,2-dialkoxybenzene is not highly critical, and can be as low as 0.1 mole per mole of titanium halide or even lower, although molar ratios of from about 0.5:1 to about 2:1 are normally employed. Higher ratios, for example 4:1 or even 10:1 or higher, can be employed, if desired, but no concomitant advantage is obtained thereby.

The reaction is preferably effected in the presence of a liquid organic reaction medium, i.e., a solvent or a diluent, such as an aliphatic or aromatic hydrocarbon, for example hexane, heptane, benzene, toluene, xylene, or a halohydrocarbon, for example mono- or dichlorobenzene. Aromatic hydrocarbons, such as benzene, toluene or xylene, are highly preferred, however, for the degree of polymer formation is considerably less than when aliphatic solvents are employed. The amount of solvent is not highly critical to this invention, although it has been found that the amount of high polymer is reduced if a solvent is present in an amount of at least 50 percent by weight, based upon butadiene. Nevertheless higher and lower amounts can be employed without affecting the ability of the dialkoxybenzene to reduce polymer formation.

The reaction can be effected by any suitable techniques known to the art, for example either batch-wise, semi-continuously or continuously. In addition, the reactant, solvent, if employed, catalyst components and dialkoxybenzene can be charged to the reaction zone in any desired manner.

The following examples are illustrative.

Example 1

A 50-milliliter pressure bottle was charged with 10 milliliters of butadiene at −78° C., and then 18.5 milliliters of benzene, 1 millimole of diethyl aluminum chloride, 0.1 millimole of titanium tetrachloride and 0.1 millimole of 1,2-dimethoxybenzene were added. The bottle was sealed and heated at 35–40° C. until the reaction had run to essential completion, as estimated by the contraction of the volume of the reaction mixture. The reaction product, which was mainly cyclododeca-1,5,9-triene, was taken up in isopropanol and the insoluble polymer was found to weigh 0.26 gram.

In a second run, conducted in an identical manner except that 0.2 millimole of 1,2-dimethoxybenzene was employed, there was recovered only 0.04 gram of isopropanol-insoluble polymer.

When no additive was present the isopropanol-insoluble polymer weighed 0.4 gram.

Example 2

To a one-liter stirred autoclave were continuously fed, in two separate streams, (1) a solution of diethyl aluminum chloride and titanium tetrachloride in benzene and (2) a solution of 1,2-dimethoxybenzene in butadiene. The Al/Ti ratio was 4:1; the dimethoxybenzene to titanium tetrachloride ratio was 0.7:1, the concentration of titanium tetrachloride in the combined feed was 4.2 millimoles per liter and the weight ratio of benzene to butadiene was 0.93 to 1.0. The trimerization was affected at 66° C. and 15 p.s.i.g. over 4 hours at a residence time of 1.3 hours, based upon feed volume, and product was continuously withdrawn from the autoclave. Analysis of a portion of the product by vapor-phase chromatography indicated that the degree of conversion of butadiene was 57 percent at an efficiency of 96.4 percent to cyclododecatriene.

The pressure was then increased to 20 p.s.i.g. and the temperature to 68° C. and the reaction continued for an additional 1.3 hours. Butadiene conversion was increased to 69.5 percent at an efficiency to cyclododeca-1,5,9-triene of 96.5 percent.

Example 3

In a run employing apparatus and procedures similar to those described in Example 2, except that the titanium tetrachloride concentration was 3.0 millimoles per liter, the 1,2-dimethoxybenzene/titanium tetrachloride mole ratio was 0.4:1, the weight ratio of benzene to butadiene was 0.58:1.0, the reaction temperature was 70° C., the pressure was 40 p.s.i.g. and the residence time was 1 hour, the butadiene conversion was 69.8 percent at an efficiency of 94.6 to cyclododeca-1,5,9-triene over a two-hour period.

Example 4

The experiment of Example 2 was repeated, except that the 1,2-dimethoxybenzene was fed to the autoclave in admixture with the benzene, diethylaluminum chloride and titanium tetrachloride rather than with the butadiene. The titanium tetrachloride concentration in this run was 3.6 millimoles per liter, the 1,2-dimethoxybenzene/titanium tetrachloride ratio was 0.5:1, the weight ratio of benzene to butadiene was 0.54:1.0, the reaction temperature was 62° C., the pressure was 36 p.s.i.g. and the residence time was 1.1 hour. The degree of conversion of butadiene was 65.1 percent at an efficiency of 95.9 percent of cyclododeca-1,5,9-triene over a 2.5-hour period.

Example 5

To a ⅜-inch ID by 20-foot long tubular reactor heated at 70° C. and under 40 p.s.i.g. pressure was continuously fed butadiene, a solution of 0.50 milliliter of titanium tetrachloride in 420 milliliters of benzene and a solution of 0.60 milliliter of 1,2-dimethoxybenzene and 2.25 milliliters of diethyl aluminum chloride in 420 milliliters of benzene. The butadiene feed rate was about 5.4 grams per minute, the diethyl aluminum chloride to titanium tetrachloride molar ratio was 4:1 the 1,2-dimethoxybenzene to titanium tetrachloride molar ratio was 4:1 and the titanium tetrachloride to butadiene weight ratio was 1:756. The run was carried out for one hour, during which time the conversion of butadiene was 13 percent, at an efficiency to cyclododecatriene of 91 percent. No polymer build up in the reactor could be detected, as determined by weighing the reactor before and after the run.

In a similar run conducted at 40° C. and 60 p.s.i.g., wherein butadiene was fed at a rate of 5.4 grams per minute, the diethyl aluminum chloride to titanium tetrachloride molar ratio was 10:1, the titanium tetrachloride to butadiene weight ratio was 2:756, and no benzene or 1,2-dimethoxybenzene was added, the reactor plugged after only 10 minutes of operation. Analysis of the reaction product obtained gave no evidence of the formation of cyclododecatriene.

Example 6

A pressure bottle was charged with 20 milliliters of butadiene, 10 milliliters of benzene, 0.1 millimole of titanium tetrachloride, 0.8 millimole of diethyl aluminum chloride and 0.07 millimole of 1,2-dimethoxybenzene. The bottle was sealed and heated at 45–50° C. for 4 hours, after which time the reaction was complete. The resulting reaction mixture was slurried in 300 milliliters of isopropanol. The resulting mixture was filtered to remove the butadiene polymer which, after drying, was weighed, and found to be 3.6 weight percent of the butadiene charged. Several additional runs were conducted employing various compounds as additives. The results of these runs are summarized below, together with the results of the above-described run as Run 1.

| Run No. | Additive | Percent Polymer |
|---|---|---|
| 1 | 1,2-dimethoxybenzene | 3.6 |
| 2 | 1,2-diethoxybenzene | 4.7 |
| 3 | None | 10.1 |
| 4 | 1,2-dihydroxybenzene | 19.4 |
| 5 | 1,2-dimethylenedioxy-4-propylbenzene | 22.5 |
| 6 | 1,4-dimethoxybenzene | 46.0 |

Example 7

Employing apparatus and procedures similar to those described in Example 6, butadiene was trimerized employing as a catalyst diethylaluminum chloride and titanium tetrachloride in a molar ratio of only 4:1. Without any additives, the isopropanol-insoluble polymer amounted to 33.3 percent of the butadiene charged, whereas the amount of polymer was only 2.8 percent when 1,2-dimethoxybenzene is present in a molar ratio of one mole per mole of titanium tetrachloride. The data from these runs, when compared with Runs 1 and 3 of Example 6, demonstrates the effect of 1,2-dimethoxybenzene in reducing the amount of polymer formation at lower diethyl aluminum chloride/titanium tetrachloride ratios, contrary to the results when no additive is present.

Example 8

Employing apparatus and procedures similar to those described in Example 6, four additional runs were conducted without additive or with 1,2-dimethoxybenzene, 2,3-dimethoxybenzoic acid or 3,4-dimethoxybenzoic acid as additives in a ratio of 0.7 mole per gram atom of titanium. The results of these runs are summarized below.

Additive: Polymer, wt. percent
1,2-dimethoxybenzene _____ 3.9
3,4-dimethoxybenzoic acid _____ 3.2
2,3-dimethoxybenzoic acid _____ 19.5
None _____ 12.1

What is claimed is:
1. In a process for producing a cyclododeca-1,5,9-triene by the trimerization of a conjugated diolefinic hydrocarbon in contact with, as a catalyst, a mixture of a titanium halide and an alkylaluminum halide, the improvement of effecting said trimerization in the presence of a 1,2-dialkoxybenzene of the formula:

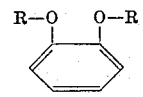

wherein each R is lower alkyl, said dialkoxybenzene being present in an amount sufficient to reduce the amount of high polymer formed.

2. The process as claimed in claim 1 wherein said 1,2-dialkoxybenzene is 1,2-dimethoxybenzene.

3. In a process for producing a cyclododeca-1,5,9-triene by the trimerization of a hydrocarbon conjugated diene of from 4 to 5 carbons in contact with, as a catalyst, a mixture of titanium tetrachloride and diethylaluminum chloride, the improvement of effecting said trimerization in the presence of a 1,2-dialkoxybenzene of the formula:

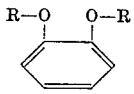

wherein each R is lower alkyl, said dialkoxybenzene being present in an amount sufficient to reduce the amount of high polymer formed.

4. The process as claimed in claim 3, wherein said 1,2-dialkoxybenzene is 1,2-dimethoxybenzene.

5. In a process for producing cyclododeca-1,5,9-triene by the trimerization of butadiene in contact with, as a catalyst, a mixture of titanium tetrachloride and diethylaluminum chloride in a molar ratio of from 1:10 to 1:1, the improvement of effecting said trimerization in the presence of a 1,2-dialkoxybenzene of the formula:

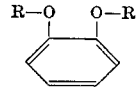

wherein each R is lower alkyl, said dialkoxybenzene being present in an amount of from 0.1 to 4 moles per mole of titanium tetrachloride.

6. The process as claimed in claim 5 wherein said 1,2-dialkoxybenzene is 1,2-dimethoxybenzene.

References Cited

UNITED STATES PATENTS

| 3,271,468 | 9/1966 | Wilke et al. | 260—666 |
| 3,280,205 | 10/1966 | Yosida | 260—666 |
| 2,964,574 | 12/1960 | Wilke | 260—666 |
| 3,149,173 | 9/1964 | Wittenberg | 260—666 |

FOREIGN PATENTS 878,120  9/1961  Great Britain.

PAUL M. COUGHLAN, Jr., *Primary Examiner.*

DELBERT E. GANTZ, *Examiner.*

V. O'KEEFE, *Assistant Examiner.*